United States Patent
Wollfarth et al.

(10) Patent No.: US 11,322,798 B2
(45) Date of Patent: May 3, 2022

(54) RECHARGEABLE BATTERY CELL HAVING A SEPARATOR

(71) Applicant: Innolith Assets AG, Basel (CH)

(72) Inventors: Claudia Wollfarth, Karlsruhe (DE);
Laurent Zinck, Mothern (FR);
Christian Pszolla, Karlsruhe (DE)

(73) Assignee: INNOLITH ASSETS AG, Basel (CH)

( * ) Notice: Subject to any disclaimer, the term of this patent is extended or adjusted under 35 U.S.C. 154(b) by 32 days.

(21) Appl. No.: 16/541,900

(22) Filed: Aug. 15, 2019

(65) Prior Publication Data

US 2020/0014011 A1  Jan. 9, 2020

Related U.S. Application Data

(63) Continuation of application No. PCT/EP2018/053204, filed on Feb. 8, 2018.

(30) Foreign Application Priority Data

Feb. 23, 2017  (EP) ..................................... 17157642
May 9, 2017  (EP) ..................................... 17170165

(51) Int. Cl.
*H01M 2/16*  (2006.01)
*H01M 4/60*  (2006.01)
(Continued)

(52) U.S. Cl.
CPC ........... *H01M 50/44* (2021.01); *H01M 4/134* (2013.01); *H01M 4/602* (2013.01); *H01M 4/662* (2013.01); *H01M 4/664* (2013.01); *H01M 50/411* (2021.01)

(58) Field of Classification Search
CPC ...... H01M 4/602; H01M 4/662; H01M 4/664; H01M 4/134; H01M 4/5825; H01M 4/485
See application file for complete search history.

(56) References Cited

U.S. PATENT DOCUMENTS 9,209,458 B2  12/2015  Zinck et al.
2005/0031942 A1  2/2005  Hennige et al.
(Continued)

FOREIGN PATENT DOCUMENTS

DE  10 2013 018 235 A1  4/2015
EP  1 150 368 A2  10/2001
(Continued)

OTHER PUBLICATIONS

International Preliminary Report on Patentability and English Translation, PCT/EP2018/053204, dated Aug. 27, 2019, 18 pages.
(Continued)

*Primary Examiner* — Jayne L Mershon
(74) *Attorney, Agent, or Firm* — Bose McKinney & Evans LLP (57) ABSTRACT

This disclosure relates to a rechargeable battery cell having a positive electrode, a negative electrode, an electrolyte, which comprises a conducting salt, and a separator, which is arranged between the positive electrode and the negative electrode. The negative electrode and the positive electrode are each an insertion electrode. The electrolyte is based on $SO_2$. The separator comprises a separator layer which is an organic polymer separator layer. The thickness of the organic polymer separator layer, relative to the loading of the positive insertion electrode with active material per unit area, is less than 0.25 mm$^3$/mg.

27 Claims, 5 Drawing Sheets

(51) Int. Cl.
*H01M 4/134* (2010.01)
*H01M 4/66* (2006.01)
*H01M 50/44* (2021.01)
*H01M 50/411* (2021.01)

(56) References Cited

U.S. PATENT DOCUMENTS

| | | | |
|---|---|---|---|
| 2011/0287304 A1 | 11/2011 | Zinck et al. | |
| 2013/0040188 A1* | 2/2013 | Zinck | H01M 10/0563 |
| | | | 429/163 |
| 2014/0125285 A1* | 5/2014 | Pozin | H01M 4/136 |
| | | | 320/127 |
| 2014/0322611 A1* | 10/2014 | Lee | H01M 4/131 |
| | | | 429/231.8 |
| 2016/0028064 A1* | 1/2016 | Choi | H01M 50/463 |
| | | | 429/145 |

FOREIGN PATENT DOCUMENTS

| | | |
|---|---|---|
| EP | 2 360 772 A1 | 8/2011 |
| WO | WO 02/09213 A1 | 1/2002 |
| WO | WO 2011/098233 A2 | 8/2011 |
| WO | WO 2013/024045 A2 | 2/2013 |

OTHER PUBLICATIONS

English Translation of International Search Report, PCT/EP2018/053204, dated Mar. 3, 2018, 4 pages.

David Linden (Editor in Chief), "Handbook of Batteries," Second Edition, McGraw-Hill, 1994, pp. 36.25-36.28.

* cited by examiner

ABLE BATTERY CELL HAVING
A SEPARATOR

RELATED APPLICATIONS

This application is a continuation of international patent application number PCT/EP2018/053204, filed Feb. 8, 2018, which claims priority to EP 17 157 642.4, filed Feb. 23, 2017, and also claims priority to EP 17 170 165.9, filed May 9, 2017, the entire disclosures of which are hereby incorporated herein by reference.

BACKGROUND AND SUMMARY

This disclosure relates to a rechargeable electrochemical battery cell having a positive electrode, a negative electrode, a separator placed between the positive electrode and the negative electrode, an electrolyte based on $SO_2$ and a conductive salt of the active metal of the cell.

Rechargeable battery cells are extremely important in many technical fields. Development goals include in particular a high energy density (charge capacity per unit of weight and unit of volume), a high current carrying capacity (low internal resistance), a long lifetime over many charge and discharge cycles, a very good operational reliability and the lowest possible cost.

The separator is an important function element of any battery cell. Its purpose is to electrically insulate the positive and negative electrodes of the battery cell. At the same time, it ensures that the charge transport that is essential for the function of the cell can take place between the electrodes through ionic conduction. The separator must therefore be wetted with electrolyte solution and permeated by it.

In practice, the most widely used commercial rechargeable batteries with organic electrolyte solutions are almost exclusively lithium ion cells. Their negative electrode is made of copper-clad carbon, which incorporates lithium ions during charging. The positive electrode is also made of an insertion material suitable for absorbing ions of the active metal. The positive electrode is usually based on lithium cobalt oxide, which is applied as a coating to a diverter element made of aluminum. Both electrodes are very thin (thickness usually less than 100 μm). In charging, the ions of active metal are withdrawn from the positive electrode and incorporated into the negative electrode. The reverse process takes place during discharging. Transport of ions between electrodes takes place by means of the electrolyte, which ensures the required ion mobility. Lithium ion cells contain an electrolyte consisting of a lithium salt (e.g., $LiPF_6$) dissolved in a nonpolar organic solvent or solvent mixture (e.g., based on ethylene carbonate). These are also referred to below as "organic lithium ion cells."

Virtually all organic lithium ion cells available commercially have a separator made of a microporous polyolefin material, for example, polypropylene or polyethylene. The electrolyte of organic lithium ion cells of nonpolar organic solvents produces wetting of the polyolefin separator, which is also nonpolar and thus ensures ion transport between the electrodes through the separator.

Electrolytes for lithium cells based on $SO_2$ have been a topic of discussion for a long time.

(1) Handbook of Batteries, David Linden (editor), $2^{nd}$ edition, McGraw-Hill, 1994 makes reference in particular to the high ionic conductivity of an inorganic electrolyte based on $SO_2$. This electrolyte is also advantageous with regard to additional electrical data. Systems with an electrolyte based on $SO_2$ have therefore already been investigated for a long time and found to be of interest for special applications. However, further commercial usability in particular is limited because the electrolyte is highly corrosive.

One advantage of the electrolyte based on $SO_2$ is that it is not flammable—in contrast with the organic electrolytes of the lithium ion cells generally used in practice. The known safety risks of lithium ion cells are caused in particular by their organic electrolytes. When a lithium ion cell catches fire or even explodes, the organic solvent of the electrolyte provides the combustible material.

Sulfur dioxide is a polar solvent. In order for a separator to be wetted with the inorganic electrolyte solution based on $SO_2$, separators on an inorganic basis are used. Inorganic separators, such as separators based on glass fiber material, for example, are made of polar materials such as metal oxides. The electrolyte is therefore capable of wetting the separator well. This ensures ion transport through the separator.

There is a high demand for improved rechargeable battery cells, which will meet the following requirements in particular:

Very good electric performance data, in particular high gravimetric and volumetric energy densities with a high available current at the same time (power density);

Safety even under challenging environmental conditions in a motor vehicle;

Long lifetime, long-term stability, i.e., in particular a large number of usable charge and discharge cycles;

Lowest possible price, i.e., inexpensive materials;

Simplest possible production processes.

On this basis, the technical problem on which this disclosure is based is to make available a separator for battery cells with electrolytes based on $SO_2$, such that this separator results in an increase in energy density and a simplified design of the battery cells—while retaining the advantageous electrical properties, in particular the long-term stability of the electrochemical battery cell.

The battery cell disclosed herein has a positive electrode, a negative electrode, a separator and an electrolyte containing $SO_2$ and a conductive salt of the active metal of the cell. According to this disclosure, the negative electrode and the positive electrode are each insertion electrodes. The electrolyte is based on $SO_2$ and the separator comprises a separator layer which is an organic polymer separator layer. The thickness of the organic polymer separator layer, based on the area-specific loading of the positive insertion electrode with active material, is less than 0.25 $mm^3$/mg according to this disclosure.

The loading of the positive electrode with active material is based on an area of 1 $cm^2$, yielding the area-based unit of the loading mg/$cm^2$. If the thickness of the separator is considered in relation to the area-based loading, i.e., the ratio of the thickness to the area-based loading, this yields values in units of $mm^3$/mg. It is thus possible to compare various systems with one another, regardless of the area extent of the electrode and the separator.

A substantial improvement in the function of the cells is achieved by combining the features according to this disclosure.

To minimize the ratio of the separator thickness to the load, it was recognized that, within the scope of this disclosure, first, the load must be high, and second, the polymer separator must be thin. As the ratio of separator thickness to load becomes lower, the increase in energy density becomes greater, i.e., the available capacity per unit of weight and/or volume unit in the cell is greater.

In the prior art, WO 2011/098233 discloses lithium ion cells, in which the positive electrode has a high load of up to 140 mg/cm$^2$ in combination with $SO_2$-based electrolyte solution obtained by using three-dimensional current collectors, but this document says nothing about the type of separator.

U.S. Pat. No. 9,209,458 B2 describes rechargeable lithium ion battery cells having insertion electrodes which use an $SO_2$-based electrolyte solution. Loading of the positive electrode in the amount of up to 180 mg/cm$^2$ is reported here. These cells have separators made of inorganic materials such as oxides, carbides or silicates. For example, glass fiber materials are also used.

The patent application WO 2013/024045 also describes lithium ion batteries with inorganic $SO_2$-based electrolyte solution using separators based on glass fibers. The glass fiber material is a textile material comprised of various textile fiber composite structures, for example, woven, nonwoven and knit fabrics of glass fibers. This document describes cells, in which at least one of the electrodes is sheathed by a cladding of a glass fiber textile material. However, this document says nothing about loading the positive electrode with active material.

In the prior art, the good wettability of the material with the electrolyte solution is regarded as an important advantage in the use of glass fiber separators in combination with an electrolyte solution based on $SO_2$. Due to the polar properties of the separator, the electrolyte penetrates well into the separator and allows the ion transport between electrodes that is absolutely essential for operation of the cell. Additional advantages of separators based on inorganic materials include their chemical and mechanical stability with respect to the corrosive $SO_2$-based electrolyte and with respect to any resulting overload products, such as aluminum chloride and sulfuryl chloride. Since the thickness of glass fiber separators may often be greater, the electrolyte can reach the electrodes through the separator from above when filling the cell. Successful electrical short circuit tests have proven that electron transport is prevented well by the separator.

However, according to the prevailing consensus, there are many disadvantages to be considered against the aforementioned advantages of separators based on inorganic materials, in particular separators made of glass fiber materials. There is a certain minimum thickness required of the separator because the woven glass fiber material otherwise becomes too permeable, which can result in short circuits. Furthermore, the weight and space required by the cell are increased by the required thickness and volume of the glass fiber separator. The result is a reduction in the gravimetric image density (Wh/kg) as well as the volumetric energy density (Wh/L).

It is difficult to process fiber materials because the material may fray when cut unless complex measures are taken to counteract fraying. In addition, the small particles that are formed are hazardous to health.

The risk of short circuits is based on the fact that fibers can break or be displaced and/or there is a poor homogeneity, for example, due to weaving errors in the textile material. Due to the risk of breakage of the fibers there is no possibility of forming tight bends in the glass fiber separator, for example, around edges. Pockets are produced that use a great deal of material and also require additional adhesive components to be closed.

Despite the many disadvantages of glass fiber separators, only inert separators based on glass fibers are in use today in the state of the art with rechargeable lithium ion battery cells because of the corrosive properties of the $SO_2$ electrolyte and its reaction products.

It has surprisingly been discovered within the scope of this disclosure that very good electrical performance data, in particular an excellent long-term stability, can be achieved much more easily if the separator used for a rechargeable electrochemical battery cell having a positive electrode, a negative electrode, a separator and an electrolyte containing $SO_2$ and a conductive salt of the active metal of the cell is a separator comprising a separator layer that is an organic polymer separator layer, and the thickness of the organic polymer separator layer is less than 0.25 mm$^3$/mg, based on the loading of the positive insertion electrode with active material in an amount relative to the area.

On the basis of the information available prior to this disclosure, it was impossible to expect that a Li—$SO_2$ cell having a polymer separator would be functional and even particularly advantageous because many organic polymers, for example, polypropylene or polyethylene, are not stable in an electrolyte solution based on $SO_2$ with overloading products.

It is reported in the prior art that the organic polymer separator is destroyed due to the corrosive electrolyte ingredients, thus resulting in short circuits. For example, regarding chemical suitability with electrolytes containing $SO_2$, the prior art cautions that "[p]olymeric separators are not chemically stable in these electrolytes, being destroyed after some time." U.S. Publication No. 2005/0031942, ¶ [0009]. This is said to result in safety critical states in the battery cell that may lead to a "thermal runaway" and thereby destroy the entire cell together with the housing. Therefore, polymer separators are not used in state of the art Li—$SO_2$ cells, but instead all the separators are based on glass fibers.

It is therefore assumed in the state of the art that wetting of a nonpolar solid, i.e., an organic polymer separator layer, with a polar liquid, i.e., an electrolyte solution based on $SO_2$ is inadequate or unworkable. Therefore, the polymer is neither wetted nor permeated. Ion transport between the positive electrode and the negative electrode is prevented by the separator, i.e., is impossible.

Filling of the battery cell is made difficult because of the use of a relatively thin polymer separator layer since the electrolyte cannot reach the electrode at the side from above through the separator when using a thick glass fiber separator, for example. The electrolyte must be transported from top to bottom within the electrodes.

Polymer separators have a low porosity. The usual porosity of known polymer separators is approximately 40%. In contrast with that, glass fiber separators have a porosity of approximately 50%. The internal resistance of the battery cell is higher due to the low porosity. The current carrying capacity of the cell declines. Therefore, those skilled in the art do not consider high-power applications to be possible.

Polymer separators have a small thickness and are therefore very fragile mechanically. Thick electrodes with three-dimensional current collectors in particular, whose webs and edges come in contact with the polymer separator at the electrode surface and especially at the electrode edges, can easily damage the separator. The thickness of the separator plays a significant role here. The thicker the separator, the easier it is to handle in the production of cells. Therefore, those skilled in the art would consider the small thickness of the polymer separator to be another obstacle to its use.

A pressure develops on the electrode package when the cell stack of positive electrodes and negative electrodes with separators in between is introduced and subsequently filled with electrolyte and then the cell subsequently goes through cycles. A thin polymer separator is very fragile under pressure from the electrodes because the roughness of thick electrodes with a three-dimensional current collector is much greater than that with lithium ion film electrodes, for example. First, abrasion from the electrode penetrates into the polymer separator, and, second, metal spikes of the three-dimensional current collector can puncture the separator, resulting in short circuits with all the consequences thereof.

Assembly of a cell is also made difficult by the use of a polymer separator. Electrostatic charges and/or rolling of the polymer separator have a negative effect on the precise stacks of the electrode package. Due to the smooth surface of the polymer separator, the electrodes shift in relation to one another. It also becomes more difficult to dry the cells because water from the electrode cannot evaporate upward through an open-pored separator. Furthermore, the polymer separator shrinks at elevated temperatures, which may destroy the precise electrical separation of the positive electrode from the negative electrode.

In organic lithium ion batteries having a negative carbon electrode, a portion of the available charge, i.e., the amount of active metal (=lithium ions), is used to form a cover layer on the negative electrode the first time a cell is charged. In doing so, lithium reacts with the organic electrolyte solution to form substances that create the cover layer.

A cover layer is also formed in cells with an electrolyte solution based on $SO_2$. If there are organic constituents in the cell, such as a polymer separator, they might be reduced electrochemically or by ingredients of the electrolyte solution and then may form additional cover layers with ions of the active metal. The cover layer capacity is therefore increased, which reduces the energy density.

An $SO_2$ electrolyte is characterized by a high conductivity. Those skilled in the art would therefore not combine this electrolyte with a polymer separator that would reduce conductivity.

Preliminary experiments with Li—$SO_2$ cells in combination with polymer separators have not yielded any usable results because complete filling of the cell with electrolyte solution was not achieved. The polymer separators were not wetted, and the electrolyte did not enter the pores of the electrodes in a sufficient amount. Several different measures were therefore taken to nevertheless achieve wetting of the electrodes and separators.

Among other things, a vacuum was created in the cell, and the electrolyte was allowed to flow into it. Additional experiments have been concerned with an increase in pressure in the cell after filling the cell or heating the filled cell to 40° C. to 50° C. The rate of filling was also varied or the cell was left to stand for a prolonged period of time after being filled. Furthermore, commercially available polymer separators with on-site application of wetting aids, so-called wetting agents, were used to achieve wetting.

None of the measures tested were able to achieve any improvements in wetting of the cell components with the electrolyte based on $SO_2$. The cell could not be filled completely. In the last case, the wetting agent was not compatible with the system. Unwanted side reactions were observed.

Despite the prevailing consensus and findings in the state of the art as well as the information and results of investigations to the contrary, which were conducted in advance, it has surprisingly been found within the scope of this disclosure that very good electrical performance data, in particular an excellent long-term stability, can be achieved for an Li—$SO_2$ cell. According to this disclosure, these properties are achieved when using an Li—$SO_2$ cell, in which a positive electrode with a high load of active material is combined with a polymer separator that is compatible with the electrolyte and is permeated with electrolyte.

To solve the problem of wettability and to ensure permeation of electrolyte through the separator, a modification of the cell and/or the polymer separator is carried out according to this disclosure. The following measures were found to be suitable within the scope of this disclosure:

Cooling of the Battery Cell

A cell stack with one or more positive electrodes, negative electrodes and polymer separators in between is placed in a housing. The housing is filled with $SO_2$-based electrolyte solution and sealed. The entire battery is cooled to temperatures below −20° C. Then, the battery is returned to room temperature. This cycle behavior is comparable to that of a state-of-the-art cell with a glass fiber separator.

Modification of the Separator

It is possible to adjust the surface energy of the separator to the surface voltage of the $SO_2$-based electrolyte solution. To do so, polar groups may be applied to the outer surface of the separator and possibly also to the inner surface.

Due to the treatment of the polymer separator with a plasma, for example, oxide-containing surface groups may be formed on the surface. The surface energy of the separator therefore drops and wetting/permeation with electrolyte solution can take place.

Similar effects are obtained when the surface of the polymer separator is coated with a suitable wetting agent.

In all modifications of the separator, the chemical compatibility of the surface groups and/or additives with the ingredients of the electrolyte solution and the electrode materials must be taken into account. The surface groups and additives must also be stable electrochemically and must not decompose at the voltages prevailing in a battery cell.

Variation in Pore Structure

By using a polymer separator made of a nonwoven material, the pore structure of the separator is altered in comparison with the pore structure of a polymer separator membrane. Polymer nonwoven materials have a linear pore structure, which means that many of the pores run at a right angle to the surface. This pore structure ensures wetting and permeation of the polymer nonwoven with $SO_2$-based electrolyte solution. Battery cells can be operated with polymer separators made of nonwoven material.

Only after a suitable measure has been carried out and the wetting and permeation of the polymer separator with $SO_2$-based electrolyte solution have been achieved can excellent results be achieved with the electrochemical battery cell according to this disclosure.

The advantages mentioned below are achieved with respect to the cell data and the processing and production of the battery cell when using the rechargeable battery cell according to this disclosure, with which the thickness of the organic polymer separator layer, based on the loading of the positive insertion electrode with active material relative to the area covered, is less than 0.25 mm³/mg. These advantages are particularly distinct and are increased when it is preferably true that the area-based volume of the organic polymer separator layer, based on the load of the positive insertion electrode with active material, relative to the area covered, amounts to less than 0.20 mm³/mg, preferably less than 0.15 mm³/mg, especially less than 0.10 mm³/mg, especially preferably less than 0.05 mm³/mg. The advantages can be summarized as follows:

Cell Data

Polymer separators have a thickness of 10-90 μm, for example, and are therefore thinner than separators based on inorganic materials, for example, separators made of woven glass fibers with a thickness of 120 μm. The volume required by the thinner separators is smaller, so that cells with a 5% to 7% higher volumetric energy density are achieved by using a combination with positive electrodes with a high load of 100 mg/cm$^2$ active mass, for example, in comparison with cells using glass fiber separators. The situation is similar for the gravimetric energy density. Due to the lower weight per unit of area (polymer nonwoven 36 g/m$^2$, for example) in comparison with the weight per unit of area of a glass fiber separator (125 g/m$^2$), this has the effect of saving weight within the cell. Higher gravimetric energy densities are achieved.

Despite the unfavorable pore structure and the low porosity of polymer separators of approximately 40-50%, the internal resistance of a corresponding cell is surprisingly no higher than the internal resistance of a comparable cell having a glass fiber separator.

The cycle stability is good and is absolutely comparable to the cycle stability of state-of-the-art cells having separators made of woven glass fibers. The usable capacity of a battery cell declines from one cycle to the next. Cycle stability is understood to refer to the number of charge and discharge cycles until the capacity has dropped to a predetermined percentage of the initial capacity (for example, 70%). The greater the number of cycles achieved, the longer the lifetime of the battery cell.

In the initial charging of a battery cell, a cover layer is formed on the negative electrode. Ions of active metal are consumed to form the cover layer and then are no longer available to the cell as capacity during further operation. According to the prevailing consensus, this cover layer capacity should therefore be low. When the polymer separator is used, the battery cell according to this disclosure surprisingly has a cover layer capacity comparable to the capacity of a cell using a glass fiber separator.

Despite the often low porosity of polymer separators and the high internal resistances therefore expected, high current loads of 2A are possible with no problem. This means that it is possible to discharge the total capacity of the cell in half an hour. Thus, for example, a cell with a capacity of 1 Ah can be discharged in half an hour with a current of 2 A.

Growth of lithium dendrites through the separator is unlikely due to the small pores, and none was detected within the scope of this disclosure.

In cycling a battery cell, a portion of the energy supplied or delivered is released in the form of heat due to the internal resistance within the cell and is dissipated as waste heat into the surroundings. When using polymer separators, however, there is surprisingly no elevated production of waste heat despite the less favorable pore structure in comparison with cells containing a glass fiber separator.

Processing/Production

Processing of flexible polymer separators in combination with positive electrodes having a high load and corresponding thickness is simpler than processing of glass fiber materials, for example. Polymer separators provide mechanical stability in processing/production of the cell.

Due to the flexibility of polymer separators, it is possible for the separator to have a Z-fold, which means that there is less cutting work.

Separator pockets or (single-layer) separator sheaths for the thick positive electrodes can be produced easily by welding. No additional adhesive or additional weldable film is required.

The test voltage may be high because the dielectric strength is higher than that with glass fibers. Better and more relevant tests are therefore possible, leading to improved quality control.

Preferred embodiments and variants of the battery cells according to this disclosure are described on the basis of the individual ingredients, which may occur or be used individually or in combination.

Positive Electrode

An active component of the cell, which changes its charge state in the redox reaction taking place on the positive electrode, is defined as the active mass of the positive electrode. With the cells according to this disclosure, the active mass of the positive electrode as an insertion compound is preferably in the form of an intercalation compound, into which the active metal can be incorporated. In discharging such a cell, ions of the active metal are incorporated into the positive active mass. For reasons of charge neutrality, this results in an electrode reaction of the positive active mass on the electrode, in which one electron is transferred by a diverter element of the electrode to the positive active mass. The process is reversed in charging: the active metal (for example, lithium) is withdrawn as an ion from the positive active mass, wherein one electron is transferred from the active mass into the diverter element of the positive electrode. The positive electrode contains active material having the following composition:

$$A_a M_b (X_c Y_d)_e Z_f$$

wherein

A is an alkali metal, an alkaline earth metal, a metal of group 12 of the periodic table or aluminum, preferably lithium, sodium, calcium, zinc or aluminum, especially preferably lithium, M is a metal or multiple metals selected from the group consisting of the transition metals and/or the non-transition metals and/or the metalloids, $(X_c Y_d)_e$ is at least one first anion, Z is at least one second anion, wherein a≥0; b>0; c>0; d≥0; e>0 and f≥0, and wherein a, b, c, d, e and f are selected to maintain electroneutrality.

M preferably comprises one or more metals, selected from the metals titanium, vanadium, niobium, tantalum, hafnium, chromium, molybdenum, tungsten, manganese, iron, osmium, cobalt, nickel, palladium, platinum, copper, silver, gold, zinc, cadmium, aluminum, scandium, yttrium, zirconium, technetium, rhenium, ruthenium, rhodium, iridium, mercury, gallium, indium, tin, lead, bismuth, selenium, magnesium, calcium, beryllium, strontium and barium, boron, silicon, germanium, arsenic, antimony and tellurium.

X preferably contains one or more elements selected from the elements titanium, vanadium, chromium, arsenic, molybdenum, tungsten, niobium, manganese, aluminum, selenium, boron, oxygen, carbon, silicon, phosphorus, nitrogen, sulfur, fluorine, chlorine, bromine and iodine, where phosphorus and sulfur are preferred.

The first anion $(X_c Y_d)_e$ preferably includes the PO$_4$ or P$_2$O$_7$ or SO$_4$ groups.

Y is preferably selected from one or more halogens, sulfur-containing groups, oxygen-containing groups or mixtures thereof.

Z is preferably selected from one or more halogens, from hydroxide-containing groups or mixtures thereof.

If a=0, it is preferable for $(X_cY_d)_e$ not to be a phosphide. M is especially preferably the metal Fe (iron). M is especially preferably the metal Fe, and the anion $(X_cY_d)_e$ is $PO_4$ or $P_2O_7$, wherein it is especially preferable for f to be 0.

In addition, iron phosphates of the active metal, for example, $LiFePO_4$ or $LiFeP_2O_7$, are preferred in particular.

The positive insertion electrode of the battery cell according to this disclosure as well as the negative electrode have as usual a diverter element which is made of metal and is used to enable the required electronically conducting connection of the active material of the respective electrode. The diverter element is in contact with the active material involved in the electrode reaction of the respective electrode.

The diverter element of the positive electrode, especially preferably also the diverter element of the negative electrode, is preferably in the form of a three-dimensional porous metal structure, in particular in the form of a metal foam. The term "three-dimensional porous metal structure" here refers to any structure made of metal which extends not only over the length and width of the flat electrode, like a thin layer of sheet metal, but also extends over its thickness dimension wherein it is so porous that the active material of the electrode can penetrate into the pores. The amount of active material incorporated is the load. The diverter element and the active mass of the positive electrode form the positive insertion electrode.

The load of the positive insertion electrode with active material, based on its area, should amount to at last 30 mg/cm², preferably at least 40 mg/cm², more preferably at least 60 mg/cm², more preferably at least 80 mg/cm², more preferably at least 100 mg/cm², more preferably at least 120 mg/cm², and especially preferably at least 140 mg/cm². The maximum loading of an electrode should be 1,000 mg/cm², preferably 750 mg/cm² and more preferably 500 mg/cm², and even more preferably 250 mg/cm².

At the same time, the positive insertion electrode is at least 0.25 mm thick, preferably at least 0.3 mm, more preferably at least 0.4 mm, more preferably at least 0.5 mm, and especially preferably at least 0.6 mm. The maximum thickness of an electrode is 5.0 mm, preferably 3.0 mm and more preferably 1.0 mm.

The great thickness of the positive electrode and the correspondingly high loading with active material are important advantages. In particular, the capacity, based on the area of the positive electrode ("area-specific capacity"), is very high. The theoretical capacity of lithium ferrophosphate (LFP) is 170 mAh/g. In experimental testing of the battery cell according to this disclosure, it was found that this theoretical value is achieved in very good approximation (more than 90%) in an Li—$SO_2$ cell.

The high loading of the positive electrode and the associated high area-specific capacity make it possible to produce cells having a relatively low electrode area with a high total capacity. If loading of a positive electrode with LFP as active material amounts to approximately 100 mg/cm², then an area of only 60 cm² is necessary for a capacity of 1 Ah. The required electrode area is thus smaller by a factor of 3 than in the case of lithium ion cells with an organic electrolyte. Conventional LFP electrodes described there have a thickness of 50 to 90 μm and an area-related loading of 4 to 6 mAh/cm². Consequently, they require a total electrode area of 170 to 250 cm² for providing a capacity of 1 Ah.

Due to the reduced area of the positive electrode, less area is needed for the separator and for the negative electrode. Furthermore, in the case of prismatic cells with a plurality of electrodes, for example, the number of arrester lugs required for connection to the cell poles is lower, and the wiring of the electrodes in the housing is greatly simplified when the number of electrodes is low.

Active Metal

The rechargeable electrochemical battery cell is preferably an alkali metal cell, in which the active metal is an alkali metal. However, the active metal may also be an alkaline earth metal or a metal from group 12 of the periodic table or aluminum. An active metal in a battery cell is a metal, whose ions, during charging or discharging of the cell, migrate to the negative or positive electrode within the electrolyte, where they participate in electrochemical processes that lead directly or indirectly to release of electrons into the external power circuit or to uptake of electrons from the external power circuit. The active metal is preferably lithium, sodium, calcium, zinc or aluminum, but lithium is especially preferred.

Lithium cells with an $SO_2$-based electrolyte are known as lithium $SO_2$ cells. In the present document, reference is made to lithium as the active metal as an example (although this in no way restricts the general scope of this disclosure).

Negative Electrode

The negative electrodes are insertion electrodes. They are made of an electrode material into which the ions of the active metal are incorporated during charging of the cell and from which they are withdrawn during discharge of the cell. They preferably contain carbon as the active mass of the negative electrode especially preferably carbon of the graphite modification.

Both the diverter element of the negative electrode and the diverter element of the positive electrode are preferably in the form of a three-dimensional porous metal structure, in particular in the form of a metal foam, wherein the porous metal structure preferably extends essentially over the entire thickness of the positive electrode and/or the negative electrode. The diverter element and active mass of the negative electrodes form the negative insertion electrode.

Organic Polymer Separator Layer

The organic polymer on which the organic polymer separator layer is based may be selected, for example, from the group consisting of:

Polyolefins (PP, PE) and their high-density (HD) representatives, e.g., PEHD (HDPE) with weakly branched polymer chains and therefore a high density between 0.94 g/cm³ and 0.97 g/cm³

Partially to completely halogen-substituted polyolefins (e.g., partially to fully fluorine-substituted, e.g., PVDF, ETFE, PTFE)

Polyesters

Polyamides

Polysulfones

Polyolefin is a collective term for polymers synthesized from alkenes, such as ethylene, propylene, 1-butene or isobutene by polymerization, such as polyethylene and polypropylene. Polyolefins are saturated hydrocarbons.

Partially to completely halogen-substituted polyolefins are polyolefins, in which hydrogen atoms have been partially or completely replaced by halogen atoms. Polyolefins are preferably partially to completely fluorine substituted. Examples of fluorine-substituted polyolefins include polyvinylidene fluoride (PVDF), ethylene tetrafluoroethylene (ETFE) and polytetrafluoroethylene (PTFE).

Alternatively and also preferably, the polymer separator layer may not include any fluorine compounds. Thus, it is preferably free of fluorine.

Polyesters are polymers with ester functions —[—CO—O—]— in their main chain. Examples of polyesters include polycarbonates (PC) or polyethylene terephthalate (PET).

Polyamides (abbreviated PA) are linear polymers with regularly recurring amide bonds along the main chain.

Polysulfones are a class of high-performance thermoplastics that contain an aryl-$SO_2$-aryl subunit. Examples of polysulfones include polysulfone (PSU), polyether sulfone (PES) and polyphenylene sulfone (PPSU).

The organic polymer separator layer is preferably a polyolefin, more preferably a polypropylene.

The thickness of the organic polymer separator layer should preferably be at most 0.2 mm. However, smaller thicknesses such as max. 0.15 mm are especially preferred, more preferably max. 0.1 mm, more preferably max. 0.09 mm, more preferably max. 0.08 mm, more preferably max. 0.07 mm, more preferably max. 0.06 mm, more preferably max. 0.05 mm, more preferably max. 0.04 mm, more preferably max. 0.03 mm and most preferably max. 0.02 mm.

Both the weight and the volume requirement as well as the mechanical stability of the organic polymer layer should be optimal. The lower the thickness of the organic polymer separator layer, the lower the weight and the lower the volume requirement of the separator. An increase in the gravimetric energy density and the volumetric energy density of the battery cell is thus possible. At the same time, the polymer separator layer should have a mechanical stability that is adapted to the electrodes used and/or to the cell structure.

In order to allow wetting and permeation of the organic polymer membrane with $SO_2$-based electrolyte, the surface energy of the two substances must be similar.

The surface energy γ is a measure of the energy required to break the chemical bonds when a new surface of a liquid or a solid is created. This is defined as the energy E that must be expended to create the surface per unit of area A:

$$\gamma = E/A$$

The SI unit of surface energy is $J/m^2$. The surface energy may also be given in mN/m. In the case of liquids, the surface energy is equal to the surface tension, which may also be expressed in dyne/cm.

The organic polymer separator layer and the electrolyte each have their own surface energy. The surface energy of the polymer separator layer is at least equal to the surface energy of the electrolyte, but the surface energy of the polymer separator layer is preferably greater than the surface energy of the electrolyte. More preferably the surface energy of the polymer separator layer is at least 5 mN/m greater, more preferably at least 10 mN/m greater, more preferably at least 15 mN/m greater, very preferably at least 20 mN/m greater than the surface energy of the electrolyte.

The wetting and the permeation of the organic polymer separator with $SO_2$-based electrolyte solution is possible only when the surface energies are similar. The wetting and permeation take place more rapidly and more thoroughly when the surface energy of the separator is greater than the surface energy of the electrolyte solution. For example, electrolyte solutions without additives of the composition $LiAlCl_4 * xSO_2$ have a surface tension of 40-45 dyne/cm at room temperature, depending on the $SO_2$ content x. The surface energy of the polymer separator must thus be at least equal to this value or preferably greater than this value.

The surface energy of the polymer separator layer and the surface energy of the electrolyte can be coordinated by having the electrolyte and/or the polymer separator layer contain functional molecules that influence the respective surface energy.

The organic polymer separator layer may be an organic polymer membrane. This microporous membrane can be produced in a very small thickness, for example, in a thickness of 0.02 mm. In combination with a porous electrode with a high load of active material, for example, a load of 100 $mg/cm^2$, high gravimetric and volumetric energy densities can be achieved because of the low weight and the low volume requirement of the separator.

In addition, these membranes have the property of entering the melting range at elevated temperatures. The pores close at these temperatures. Ion transport is therefore no longer possible. This is desirable because safety-critical conditions occur at elevated temperatures. Current transport within the cell is interrupted due to this so-called "shutdown" mechanism, and further heating is therefore prevented.

In a preferred embodiment, if the polymer separator layer is an organic polymer membrane, the separator comprises at least one nonwoven layer in addition to the organic polymer membrane, such that the organic polymer membrane has a first surface and a second surface, while the nonwoven layer has a first nonwoven layer surface and a second nonwoven layer surface. One of the surfaces of the organic polymer membrane comes in contact with one of the nonwoven layer surfaces, and the nonwoven layer is preferably a polymer, more preferably a polyolefin and very preferably polypropylene.

The separator may thus consist of a composite material, such that the organic polymer membrane and the nonwoven layer are permanently bonded to one another in such a way that their contacting surfaces are joined inseparably.

In a preferred embodiment, the thickness of the nonwoven layer between the first and second nonwoven layer surfaces is greater than the thickness of the organic polymer membrane between the first and second surfaces, preferably at least twice as large, especially preferably at least three times as large, especially preferably at least four times as large, very preferably at least five times as large.

If the polymer separator layer is an organic polymer membrane, then the separator in another preferred embodiment additionally comprises at least one layer containing an inorganic material in addition to the organic polymer membrane, wherein the organic polymer membrane has a first surface and a second surface, the layer containing an inorganic material has a first layer surface and a second layer surface, and one of the surfaces of the organic polymer membrane comes in contact with one of the layer surfaces of the layer containing an inorganic material.

The inorganic material contained in the layer is preferably a ceramic material, such as aluminum oxide, silicon oxide or titanium dioxide. In addition to the inorganic material, the layer may also contain a binder, including inorganic binders, for example, PDVF, PTFE or THV.

This embodiment may also be a composite material, wherein the organic polymer membrane and the layer containing an inorganic material are permanently bonded to one another in such a way that their contacting surfaces are inseparably joined.

The combination of organic polymer separator membrane and a layer containing an inorganic material is characterized by good wettability with $SO_2$-based electrolyte solution.

Any combinations of organic polymer membrane, nonwoven layer and the layer containing an inorganic material are also possible. Separators having multilayer structures may therefore be formed.

The organic polymer separator layer may be an organic polymer nonwoven. Polymer nonwovens are nonwoven polymer materials with a linear pore structure. The thickness of the polymer nonwovens can be reduced by pressing prior to processing, for example.

One advantage of polymer nonwovens is their easy wettability with $SO_2$-based electrolyte. Because of the linear pore structure, the electrolyte penetrates better into the nonwoven than into other structures of the polymer. Another advantage of polymer nonwovens is their low cost in comparison with polymer membranes.

The polymer nonwoven preferably contains a ceramic material, for example, aluminum oxide, silicon oxide or titanium dioxide. In addition to the inorganic material, the polymer nonwoven may also contain binders, including binders on an organic basis, for example, PDVF, PTFE or THV. Both the ceramic material and the binder may be present as a layer on the surface and/or incorporated into the porous layer structure of the polymer nonwoven.

In a preferred embodiment, at least one of the electrodes is sheathed by a sheath of the organic polymer separator layer. In this case, the surface extent of the sheath of the organic polymer separator layer is greater than the surface extent of the electrode, so that the organic polymer separator layer extends beyond the edges of the electrode. Two layers of the organic polymer separator layer covering the electrode on both sides are joined together at the edge of the electrode by an edge connection. Possible edge connections include welding, gluing or fusing, for example.

Electrolyte

According to this disclosure, an electrolyte containing $SO_2$ is used, preferably an $SO_2$-based electrolyte. Within the scope of this disclosure, this term refers to an electrolyte that contains sulfur dioxide not as an additive in a low concentration but instead in which the mobility of the ions of the conductive salt that is present in the electrolyte and is responsible for the charge transport is ensured at least partially by $SO_2$. $SO_2$ is the solvent for the conductive salt.

The electrolyte preferably contains at least 20% by weight $SO_2$ (wt %), where values of 35% by weight $SO_2$, 45% by weight $SO_2$, 55% by weight $SO_2$ and 65% by weight $SO_2$, each based on the total amount of electrolyte contained in the cell, in this order, are additionally preferred. The electrolyte may also contain up to 95% by weight $SO_2$, with maximum values of 75% by weight $SO_2$, 85% by weight $SO_2$ and 90% by weight $SO_2$, in that order, being preferred.

The electrolyte contains relatively high concentrations of $SO_2$ in comparison with the amount of conductive salt, with minimum values of 1.5 mol $SO_2$, 2 mol $SO_2$, 2.5 mol $SO_2$, 3 mol $SO_2$, 4 mol $SO_2$, 4.5 mol $SO_2$, 5 mol $SO_2$ and 6 mol $SO_2$ per mol conductive salt being especially preferred, in this order.

The conductive salt content in the electrolyte is preferably less than 70% by weight of the weight of the electrolyte, more preferably less than 60% by weight, less than 50% by weight, less than 40% by weight, less than 30% by weight, less than 20% by weight or less than 10% by weight.

An electrolyte with a relatively low conductive salt concentration and a high $SO_2$ concentration associated therewith is advantageous in particular with regard to stability over many charge and discharge cycles, despite the high vapor pressure this entails.

The $SO_2$ concentration preferably amounts to max. 220 mol $SO_2$ per mol conductive salt, preferably max. 200 mol $SO_2$, more preferably max. 100 mol $SO_2$, more preferably max. 50 mol $SO_2$, more preferably max. 30 mol $SO_2$, more preferably max. 25 mol $SO_2$, and especially preferably max. 20 mol $SO_2$ per mol of conductive salt in each case. In selecting the $SO_2$ concentration, the conductivity of the respective electrolyte solution should also be taken into account. The lower the $SO_2$ concentration described in this section, the higher the conductivity.

The total amount of $SO_2$ and conductive salt is preferably greater than 50% by weight (wt %) of the weight of the electrolyte, more preferably greater than 60% by weight, greater than 70% by weight, greater than 80% by weight, greater than 85% by weight, greater than 90% by weight, greater than 95% by weight or greater than 99% by weight.

The electrolyte preferably has only little or no organic material content, such that the amount of organic material in the electrolyte, which is present in the form of one or more solvents or additives (co-solvents) for example, is max. 50% by weight of the weight of the electrolyte. Smaller amounts of max. 40% by weight, max. 30% by weight, max. 20% by weight, max. 15% by weight, max. 10% by weight, max. 5% by weight, max. 1% by weight of the weight of the electrolyte are preferred. The electrolyte is also preferably free of organic solvents.

Organic solvents are flammable and therefore are often a safety risk for a battery cell. The lower the organic solvent content, the lower is the risk of fire.

According to another preferred embodiment, the organic material preferably has a flash point of less than 200° C., with values of 150, 100, 50, 25 and 10° C. being additionally preferred, in this order.

According to another preferred embodiment, the electrolyte contains two or more organic materials, wherein the organic materials preferably have an average flash point (calculated from the weight ratio) on the whole of less than 200° C., with values of 150° C., 100° C., 50° C., 25° C. and 10° C., in that order, being additionally preferred.

The electrolyte is especially preferably essentially free of organic materials, where "essentially" is to be understood to mean that the amount of any organic materials that might be present is so low that they do not constitute a safety risk. The organic material is preferably not an additive but instead is merely a contaminant, for example, due to excess carbon in the active material of the positive electrode or other carbonaceous materials for example, the negative electrode. The electrolyte preferably contains no more than 500 ppm organic material.

The electrochemical charge of the $SO_2$ (sulfur dioxide) contained in the cell, calculated with one Faraday per mol $SO_2$ (sulfur dioxide) is preferably greater than the amount of charge of the active metal that can theoretically be stored electrochemically in the positive electrode.

In the case of an alkali metal cell, a tetrahaloaluminate, especially preferably a tetrachloroaluminate of the alkali metal, for example, $LiAlCl_4$, is preferably used as the alkali metal cell. Other preferred conductive salts include aluminates, halides, oxalates, borates, phosphates, arsenates and gallates of an alkali metal, in particular lithium.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

The details of the description of the experimental cells A1 to A5 and B1 (reference cell) are given in Table 1.

Figure 1:
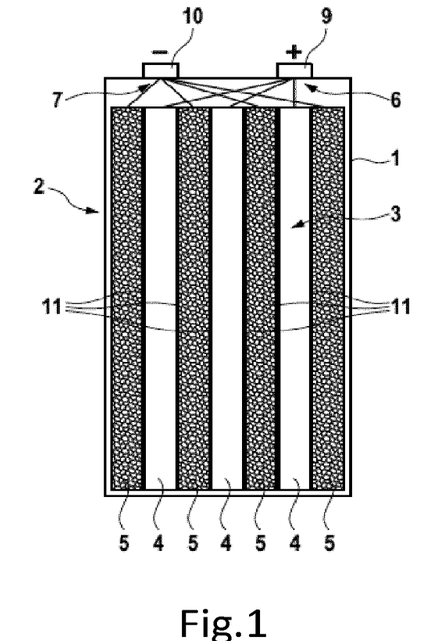
FIG. 1 shows a cross-sectional diagram of a battery cell according to this disclosure.

The housing 1 of the rechargeable battery cell 2 shown in FIG. 1 encloses an electrode array which includes several (three in the case shown here) positive electrodes 4 and several (four in the case shown here) negative electrodes 5. The electrodes are each separated from one another by separators 11. The electrodes 4, 5 are connected as usual by electrode terminals 6, 7 to corresponding terminal contacts 9, 10 on the battery. The cell is filled with an $SO_2$-based electrolyte (not shown in the drawing) in such a way that the electrolyte penetrates as thoroughly as possible into all the pores, in particular within electrodes 4, 5 and within separators 11. The electrolyte may be liquid or gelatinous.

The electrodes 4, 5 are usually designed to be flat, i.e., as layers with a small thickness in relation to their area extent. The electrodes 4, 5 have a diverter element made of metal, as is customary, which is used to enable the required electronically conducting connection of the active material of the respective electrode. The diverter element is in contact with the active material involved in the electrode reaction of the respective electrode. The housing 1 of the prismatic cell shown here is essentially cube-shaped with the electrodes and the walls illustrated in cross section in FIG. 1 extending perpendicular to the plane of the drawing and running essentially in a straight and planar form. However, the cell according to this disclosure may also be designed as a spiral cell.

The positive and negative electrodes 4 and 5 are insertion electrodes. They are made of an electrode material into which the ions of the active metal are incorporated while the cell is being charged and from which they are withdrawn while the cell is being discharged.

Figure 2:
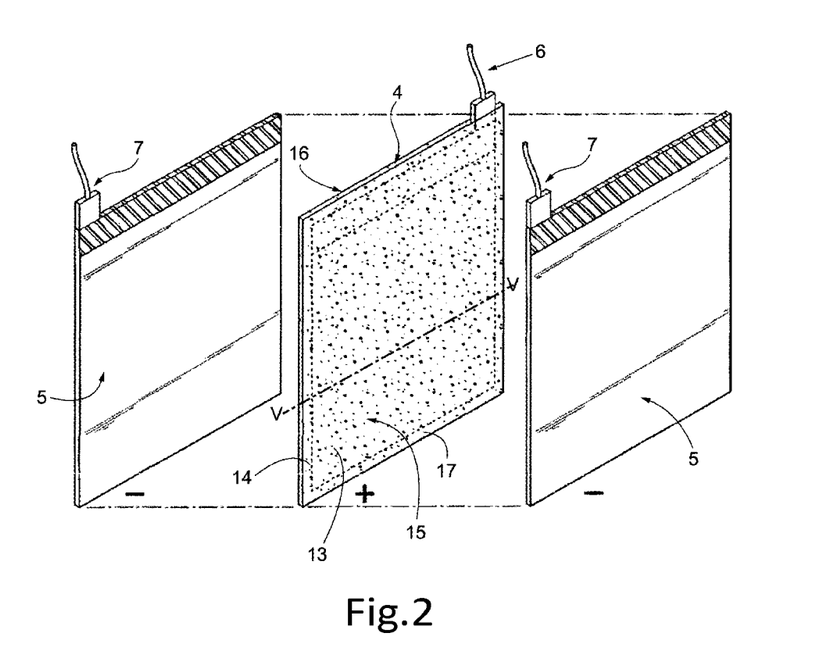
FIG. 2 shows a perspective diagram of one positive electrode and two negative electrodes of an electrode stack in a preferred embodiment.

FIG. 2 shows two negative electrodes 5 and one positive electrode 4. Each one of the electrodes has a connecting wire 6 and/or 7 for connection to the corresponding electrical connecting contacts 9 and/or 10 of the cell, respectively.

In the preferred embodiment illustrated here, the positive electrode 4 (preferably all the positive electrodes in the cell) is sheathed by a sheath 13 of an organic polymer separator layer (polymer separator bag). The area extent of the sheath here is greater than the area extent of the electrode, the border 14 of which is shown as a dashed line in FIG. 2. Two layers 15 and 16 of the organic polymer separator layer covering the electrode on both sides are joined together at the edge of the electrode 11 by an edge connection 17. The edge connection 17 preferably extends along at least two, more preferably three of the four edges of the polymer separator bag 13 and/or the electrode 4 situated therein, namely its lower edge and its side edges running upward. The edge connection is preferably uninterrupted, i.e., continuous, for example, at the edges where it is present. Depending on the application case, however, it may also be interrupted. The edge connection may be formed by welding or fusing the layers 15 and 16 of the organic polymer separator layer covering the electrode on both sides. It would also be possible to apply suitable adhesive materials in solid or liquid form.

The electrodes 4, 5 are arranged in alternation in the electrode stack. In general, it is preferable if the number of unsheathed electrodes (preferably the negative electrodes) is greater by one than the number of electrodes having a polymer separator bag (preferably the positive electrodes). The result is that the outer end faces of the electrode stack are formed by the unsheathed electrode surfaces (preferably the negative electrodes).

Experiments

All experiments were conducted in battery cells constructed from 12 negative electrodes with an active material comprised of carbon, an electrolyte based on $6 \times SO_2$ (cells A1, A2, A4 and A5) or with an electrolyte based on $4.5\ SO_2$ (cell A3) with $LiAlCl_4$ as the conductive salt ($LiAlCl_4 \times 6\ SO_2$, and/or $LiAlCl_4 \times 4.5\ SO_2$) and of 11 positive electrodes with lithium ferrophosphate (LFP) as the active material.

The positive electrodes had a loading with active material, i.e., with LFP, of approximately 100 mg/cm². The rated capacity of the cells was approximately 1,000 mAh.

The cells differ in the type of separator used. Cells with an organic polymer separator are labeled with letters A and a respective number. Reference cells are labeled as B1.

TABLE 1

Description of the Experimental Cells

| Experimental Cell | | Reference Cell | |
|---|---|---|---|
| A1 | Cell with polypropylene membrane separator 25 μm no pretreatment | B1 | Cell with woven glass separator 120 μm |
| A2 | Cell with polypropylene membrane separator 25 μm cooled before operation | B1 | Cell with woven glass separator 120 μm |
| A3 | Cell with polypropylene nonwoven separator 75 μm nonwoven calendered | B1 | Cell with woven glass separator 120 μm |
| A4 | Cell with polypropylene membrane separator 25 μm separator treated with plasma | B1 | Cell with woven glass separator 120 μm |

TABLE 1-continued

Description of the Experimental Cells

| Experimental Cell | Reference Cell |
|---|---|
| A5 | Cell with polypropylene membrane separator 25 μm separator coated with surfactant |

Several cycle experiments were conducted. In doing so, the cells were charged at 1 C corresponding to a current of 1 A up to a final charge voltage of 3.6 volts and a drop in the charge current to 200 mA. Then, the cells were discharged at the same amperage until reaching a potential of 2.5V. A pause of 10 minutes was inserted between charging and discharging.

The resulting discharge capacity $Q_D$ is expressed as the percentage of the rated capacity $Q_N$. The rated capacity $Q_N$ is obtained by subtracting the capacity consumed in the first cycles to form the cover layer on the negative electrode from the theoretical capacity $Q_{th}$ of the positive electrode.

Two types of cells that differed in the separator used were tested in each measurement. Each curve represents an average of four identical measurements.

Experiment 1

Figure 3:
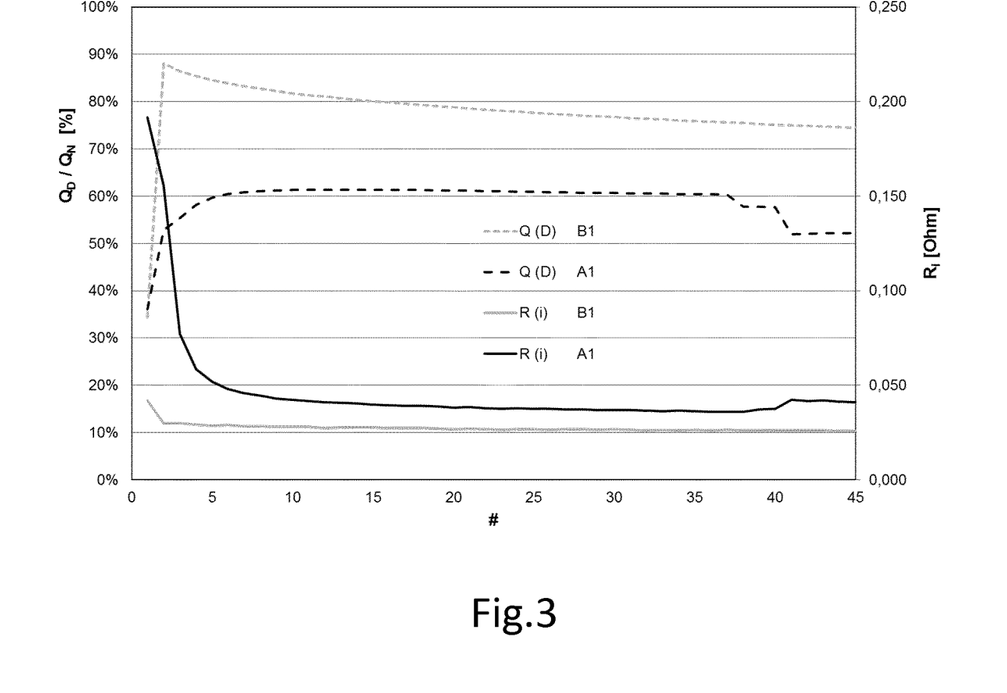
FIG. 3 shows the discharge capacity of the electrical resistance as a function of the number of cycles of experimental cells A1 and B1.

FIG. 3 shows the results of experiment 1, in which cells (B1) containing a state-of-the-art separator made of woven glass fiber (GG) are compared with cells (A1) containing a polymer membrane separator made of polypropylene (PP). The usual commercial separator of PP was used in the condition as delivered. The cells having a PP separator were not subjected to any further treatment after being filled with electrolyte.

The cells were charged and discharged over several cycles as described above. FIG. 3 shows the discharge capacity $Q_D$ in percentage of the rated capacity $Q_N$ and the internal resistance $R_i$ for both cells, plotted as a function of the number of cycles # (charge/discharge cycles).

The rated capacity $Q_N$ of the cells B1 with the woven glass fiber separator runs from approximately 87% at first to a value of approximately 75% in the 45$^{th}$ cycle.

The cells A1 with a PP separator achieve only approximately 60% of the rated capacity $Q_N$ and drop to approximately 50% in the final cycles.

The resistance of the cell B1 with the woven glass fiber separator remains constant at approximately 0.025 ohms after an initial value of 0.04 ohms. The comparative cell A1 with a PP separator has a much higher internal resistance $R_i$. The values ($R_i$) are initially almost 10 times higher, amounting to 0.19 ohms. Only after 10 cycles does a linear course begin, starting at approximately 0.04 ohms and dropping to 0.035 ohms by the 38$^{th}$ cycle, but then increase again irregularly to 0.04 ohms.

These results reflect the poor compatibility of polymer membrane separators with an electrolyte solution based on $SO_2$. The wetting of the separator with $SO_2$-based electrolyte solution is presumably so poor that even the permeation of the separator and the filling of the pores of the porous negative and positive electrodes with electrolyte are inhibited. The result is high internal resistance values $R_i$. Ion transport is inhibited and the discharge capacity $Q_D$ is very low.

Within the context of this disclosure, however, it has surprisingly been found that the negative properties of a polymer separator can be overcome by suitable treatment of the polymer separators (as described above), and these separators can be used advantageously in combination with positive electrodes with a high load of active material in a cell with $SO_2$-based electrolyte.

Experiment 2

Figure 4A:
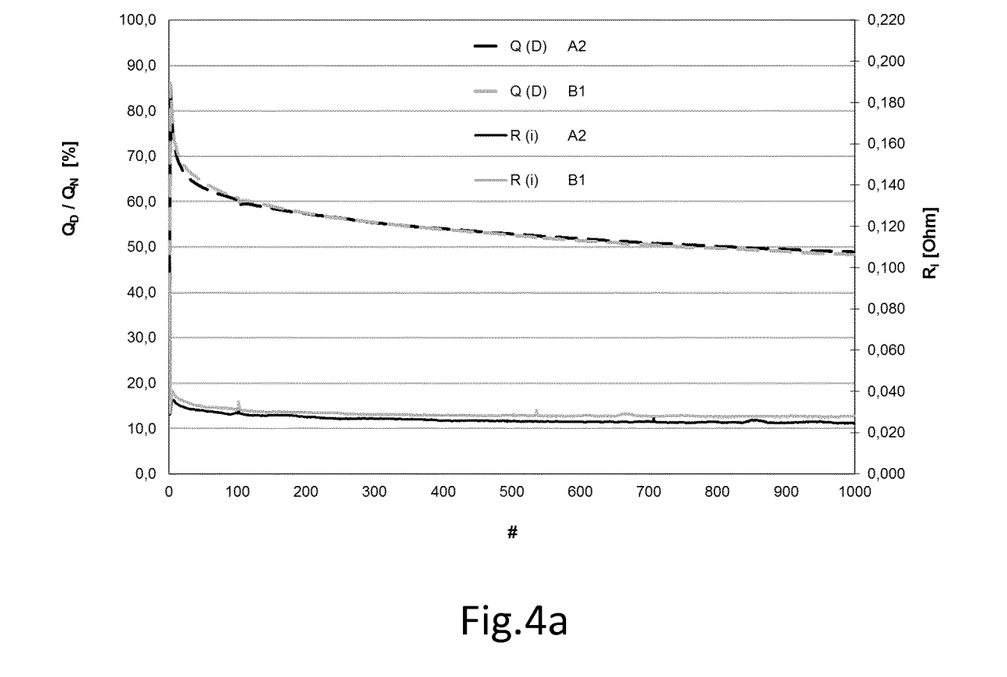
FIG. 4a shows the discharge capacity of the electrical resistance as a function of the number of cycles of experimental cells A2 and B1.
Figure 4B:
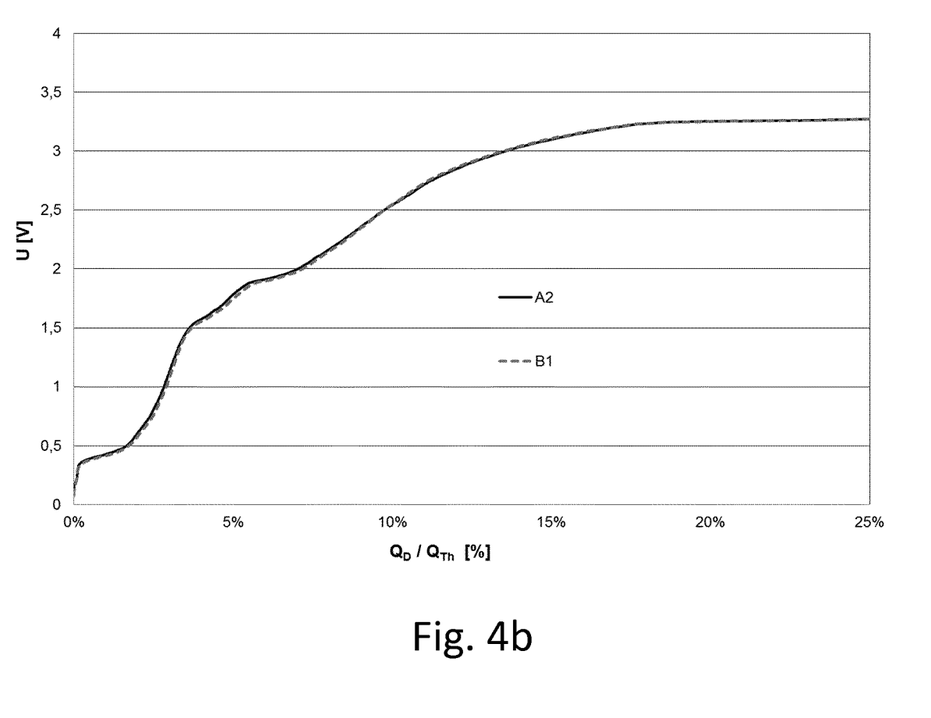
FIG. 4b shows the voltage as a function of the capacity of the negative electrode of the experimental cells A2 and B1.

FIGS. 4a and 4b show the results of another experiment, using reference cells B1 identical to those in experiment 1. However, in contrast with experiment 1, the cells A2 with the polymer separator were stored for about 4 hours at −25° C. after being filled with the electrolyte.

FIG. 4a shows the discharge capacity $Q_D$ in percentage of the rated capacity $Q_N$ and the internal resistance $R_i$ for both cells A2, B1, plotted as a function of the number of cycles (charge/discharge cycles).

The capacity curves for the two cells A2 and B1 are almost identical. From approximately 80% of the rated capacity $Q_N$ at the beginning, the discharge capacity $Q_D$ drops to a level of approximately 48% in the 1,000$^{th}$ cycle.

The cell A2 with the polymer separator has an excellent long-term behavior, achieving 1,000 cycles without an unusual drop in capacity.

The resistance $R_i$ of the cell B1 with the woven glass fiber separator is constant at approximately 0.022 ohm after an initial value of 0.027 ohm. Surprisingly, the comparative cell A2 with the PP separator has a lower internal resistance $R_i$. The $R_i$ values are initially 0.024 ohms. Then a linear (constant) curve is established at approximately 0.018 ohms.

With the first charging of the lithium ion battery cell A2 described here, a cover layer is formed on the negative electrode. Lithium ions are consumed to form the cover layer and then are no longer available to the cell A2 as capacity in further operation.

FIG. 4b shows the first charge cycle of a battery cell. The voltage curves U (V) of the two battery cells A2 and B1 are plotted as a function of the capacity Q in % based on the theoretical capacity $Q_{th}$ of the negative electrode. Intercalation of lithium ions begins at approximately 3.2 volts, but first the lithium ions are consumed to form the cover layer.

In the case presented here, the capacity of the cover layer amounts to approximately 16% of the theoretical capacity $Q_{th}$ of the negative electrode. There is no difference between the cells B1 with the woven glass fiber separator and the cells A2 with the PP separator.

Battery cell A2 according to this disclosure surprisingly has a cover layer capacity comparable to that of a cell B1 using a glass fiber separator. Those skilled in the art would expect that, when organic constituents are present in cell A2, as is the case with a polymer separator, they would be reduced electrochemically and would form additional cover layers with the lithium ions, which would result in an increased cover layer capacity in comparison with the state of the art.

Experiments 3 and 4

Additional polymer separators were tested in these experiments. Cells with a polymer nonwoven separator (A3, FIG. 5) and cells with a polymer membrane separator (A4, FIG. 6) previously treated with plasma were compared with state-of-the-art reference cells B1 containing glass fiber separators.

Figure 5:
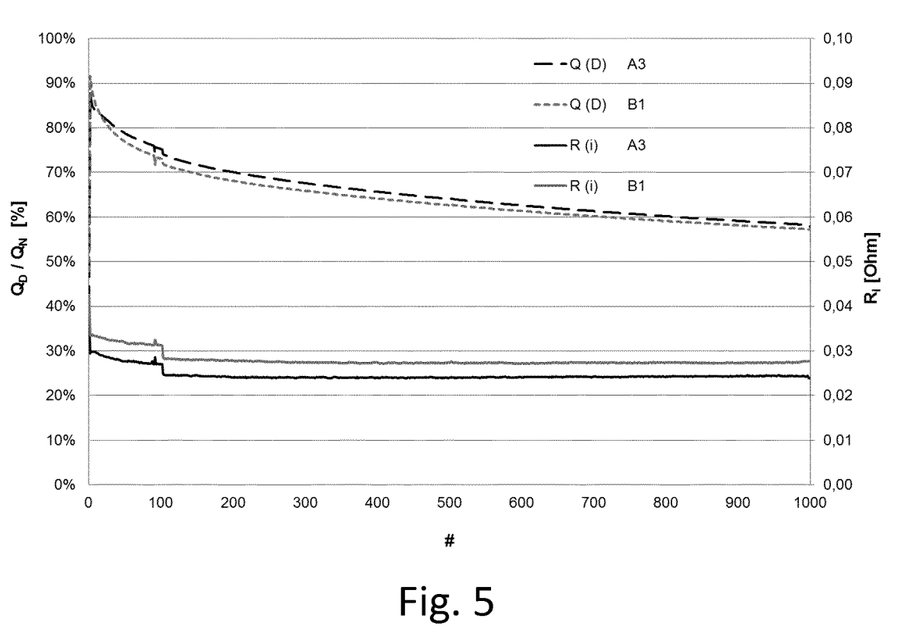
FIG. 5 shows the discharge capacity of the electrical resistance as a function of the number of cycles of experimental cells A3 and B1.
Figure 6:
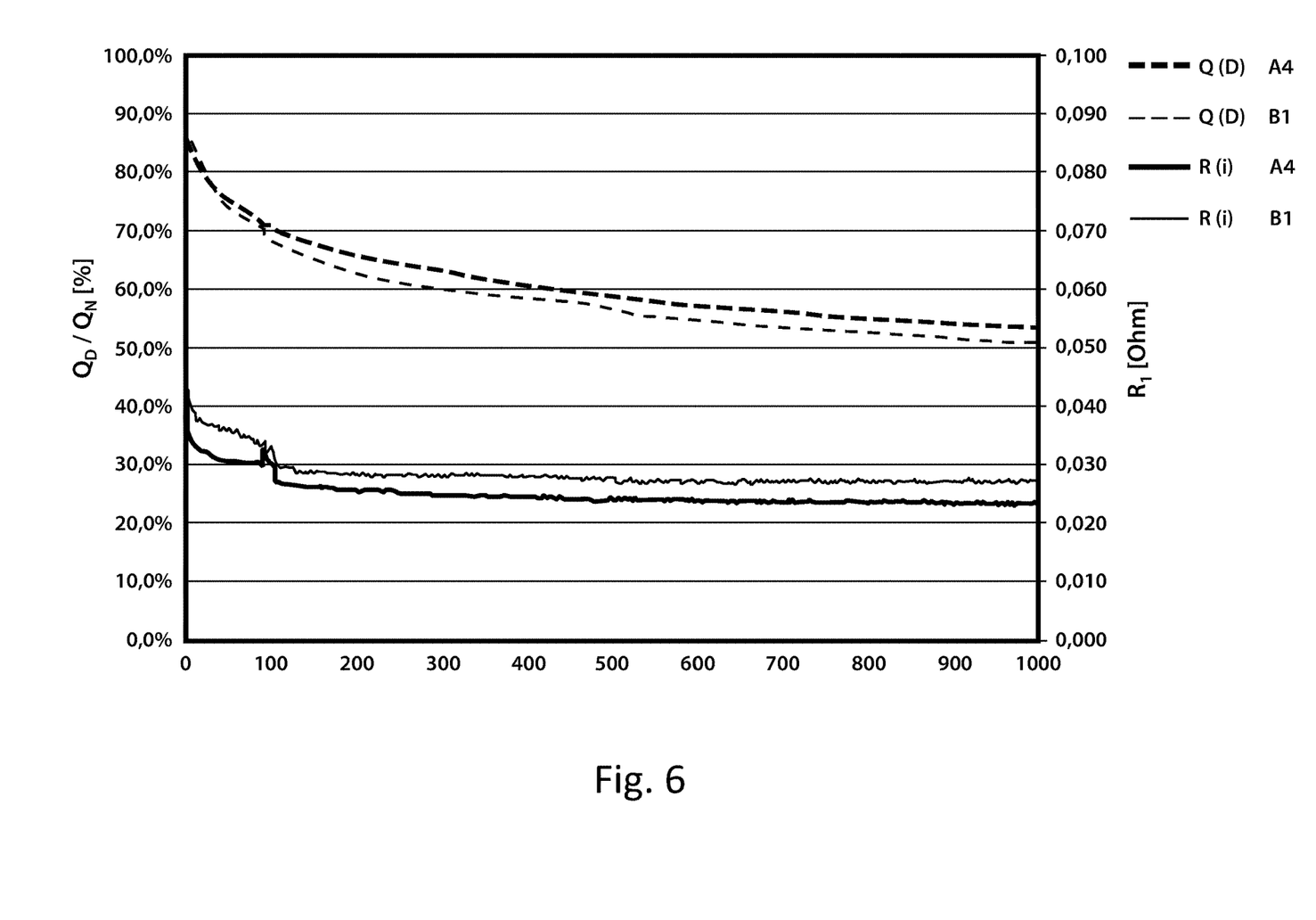
FIG. 6 shows the discharge capacity of the electrical resistance as a function of the number of cycles of experimental cells A4 and B1.

FIGS. 5 and 6 show the discharge capacity $Q_D$ in % of the rated capacity $Q_N$ and the internal resistance $R_i$ for the respective cells plotted as a function of the number of cycles (charge/discharge cycles).

Both measurements show a similar picture for the experimental cells A3 and A4 with the polymer separator. The discharge capacity $Q_D$ is higher in comparison with that of the state-of-the-art cells B1. At the same time, the resistance values Ri are reduced. These results yield a battery cell that is improved in comparison with the state of the art.

Experiment 5

Figure 7:
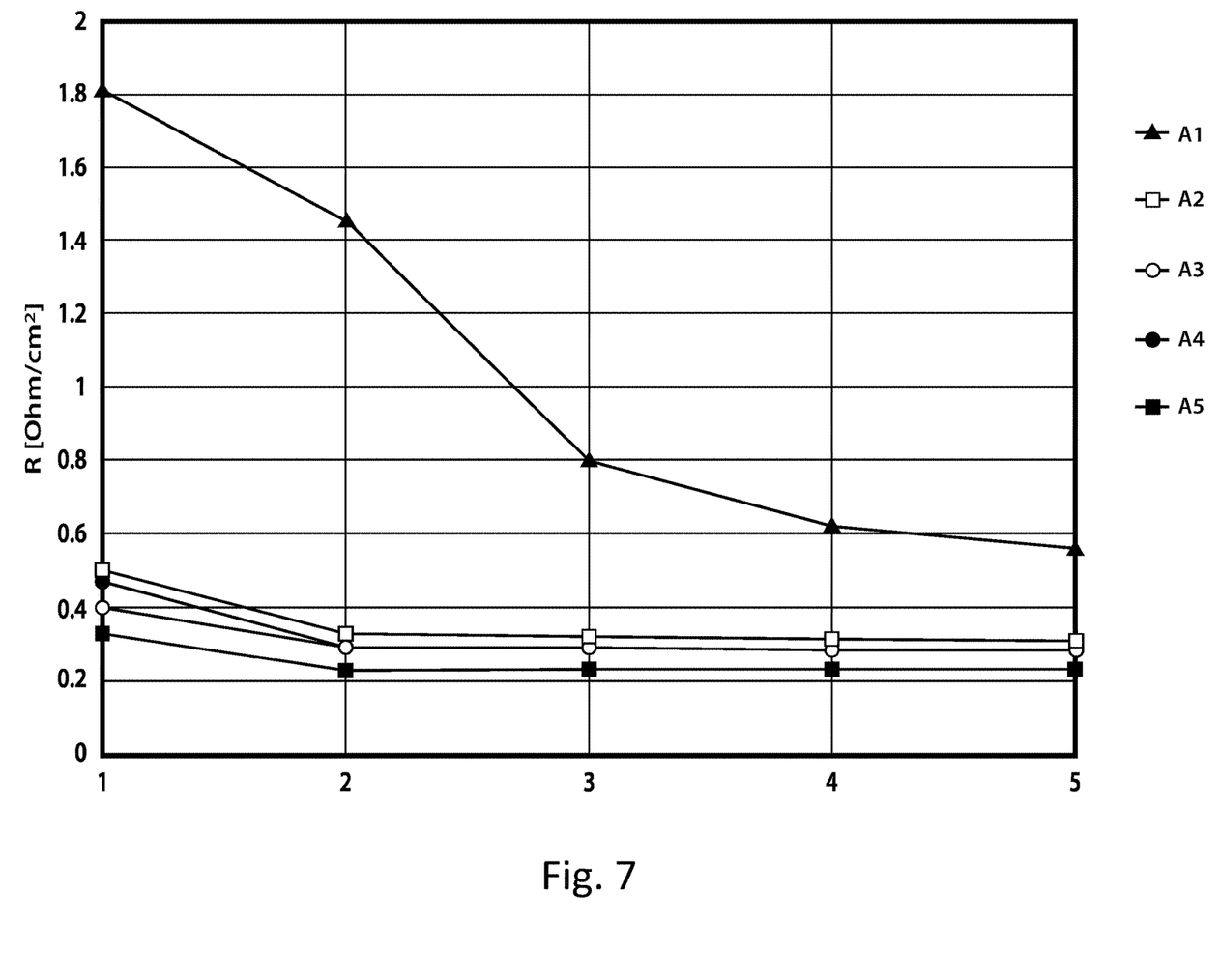
FIG. 7 shows the electrical resistance as a function of the number of cycles of experimental cells A1-A5.

FIG. 7 shows the resistance values $R_i$ of the cells A1-A5 in the first five cycles. For a better comparison, the resistance values $R_i$ were standardized to an electrode area of 1 cm². It can be seen clearly here that the cell A1, which has a commercial PP separator, has a resistance value $R_i$ that is higher by a factor of 4 to 5 in the first cycle. In the following cycles, the resistance $R_i$ is also still twice as high as that in the other cells A2-A5. The separators in cells A2-A5 were modified in various ways. Table 1 summarizes the details. All the measurement curves showed resistance values from 0.3-0.6 ohms/cm² in the first cycle to 0.2-0.4 ohms/cm² in the additional cycles.

Experiment 6

For this experiment, 1 cm² of the positive electrode/separator unit having an electrode thickness of the positive electrode of 600 μm and a loading with active material LiFePO$_4$ of 100 mg/cm² is considered. For this unit, the gravimetric energy density and the volumetric energy density were calculated with an average discharge voltage of 3.2 volts in one case when using a woven glass fiber separator with a thickness of 120 μm, and in another case, when using an organic polymer membrane according to this disclosure with a thickness of 20 μm. Table 2 summarizes the calculated values.

TABLE 2

Energy Densities

| Separator | Gravimetric energy density (Wh/kg) | Improvement over the cell with glass fiber | Volumetric energy density (Wh/L) | Improvement over the cell with glass fiber |
|---|---|---|---|---|
| Woven glass fiber 120 μm state of the art | 332.8 | | 761.6 | |
| Organic polymer membrane 20 μm | 358.5 | +8% | 873.6 | +15% |

Use of an organic polymer membrane in the case in question here increases the gravimetric energy density by 8% and increases the volumetric energy density by 15%.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A rechargeable battery cell, comprising:
   a positive insertion electrode loaded with active material;
   a negative insertion electrode;
   an electrolyte based on SO$_2$, the electrolyte comprising a conductive salt; and
   a separator between the positive electrode and the negative electrode, wherein the separator comprises an organic polymer separator layer having a thickness, and wherein the ratio of the thickness of the organic polymer separator layer to the loading of the positive electrode with active material per unit area is less than 0.25 mm³/mg.

2. The battery cell according to claim 1, wherein the ratio of the thickness of the organic polymer layer to the loading of the positive electrode with active material per unit area is less than 0.20 mm³/mg.

3. The battery cell according to claim 2, wherein the ratio of the thickness of the organic polymer layer to the loading of the positive electrode with active material per unit area is less than 0.10 mm³/mg.

4. The battery cell according to claim 1, wherein the loading of the positive insertion electrode with active material is at least 30 mg/cm².

5. The battery cell according to claim 1, wherein the thickness of the organic polymer separator layer is no more than 0.2 mm.

6. The battery cell according to claim 1, wherein the positive electrode is at least 0.25 mm thick.

7. The battery cell according to claim 1, wherein the polymer separator layer is made of a polyolefin, a partially to completely halogen-substituted polyolefin, a polyester, a polyamide or a polysulfone.

8. The battery cell of claim 7, wherein the polymer separator layer is made of polypropylene.

9. The battery cell according to claim 1, wherein the polymer separator layer has a surface energy that is at least 5 mN/m greater than the surface energy of the electrolyte.

10. The battery cell according to claim 9, wherein the polymer separator layer contains functional molecules which influence the surface energy of the polymer separator layer.

11. The battery cell according to claim 1, wherein the polymer separator layer is substantially devoid of fluorine compounds.

12. The battery cell according to claim 1, wherein the polymer separator layer comprises an organic polymer membrane and the separator has an additional layer, wherein:
   the additional layer has a first layer surface and a second layer surface and is: (i) formed from a polymer nonwoven consisting of polyolefin, and/or (ii) formed from a layer containing an inorganic ceramic material; and
   the organic polymer membrane has a first surface and a second surface and one of the first and second surfaces of the organic polymer membrane contacts the first or second layer surface of the additional layer.

13. The battery cell according to claim 12, wherein the separator is a composite material and the organic polymer membrane and the additional layer are permanently bonded to one another whereby their contacting surfaces are inseparably joined.

14. The battery cell according to claim 1, wherein the polymer separator layer is an organic polymer nonwoven.

15. The battery cell according to claim 14, wherein the organic polymer nonwoven contains a ceramic material.

16. The battery cell according to claim 15, wherein the ceramic material is one or more of aluminum oxide, silicon oxide or titanium dioxide.

17. The battery cell according to claim 16, wherein the organic polymer nonwoven contains a binder, wherein both the ceramic material and the binder are present as a layer on the surface and/or are incorporated into a porous layer structure of the polymer nonwoven.

18. The battery cell according to claim 1, wherein the positive insertion electrode comprises an active material with the composition:

$$A_a M_b (X_c Y_d)_e Z_f$$

where
- A is an alkali metal, an alkaline earth metal, a metal of group 12 of the periodic table;
- M is a metal or several metals selected from the group consisting of the transition metals and/or the non-transition metals and/or the metals;
- $(X_c Y_d)_e$ is at least one first anion;
- Z is at least one second anion;
- where $a \geq 0$; $b > 0$; $c > 0$; $d \geq 0$; $e > 0$ and $f \geq 0$, and
- where a, b, c, d, e and f are selected so that electroneutrality is obtained.

19. The battery cell according to claim 18, wherein the M is the metal Fe and wherein $(X_c Y_d)_e$ is $PO_4$ or $P_2 O_7$ and f is 0.

20. The battery cell according to claim 1, wherein the negative insertion electrode contains carbon as active material to receive ions.

21. The battery cell according to claim 1, wherein the positive electrode and/or the negative electrode has/have a diverter element with a three-dimensional porous metal structure in the form of a metal foam, wherein the porous metal structure preferably extends essentially over the entire thickness of the positive electrode and/or the negative electrode.

22. The battery cell according to claim 1, wherein the electrolyte contains at least 1.5 mol $SO_2$ per mol conductive salt.

23. The battery cell according to claim 22, wherein the electrolyte contains at least 2.5 mol $SO_2$ per mol conductive salt.

24. The battery cell according to claim 1, wherein $SO_2$ content in the electrolyte is greater than 20% by weight of the weight of the electrolyte.

25. The battery cell according to claim 1, wherein the electrolyte contains organic solvents in an amount less than 50% by weight of the weight of the electrolyte.

26. The battery cell according to claim 25, wherein the electrolyte contains organic solvents in an amount less than 5% by weight of the weight of the electrolyte.

27. The battery cell according to claim 1, wherein the surface energy of the polymer separator layer is equal to or greater than the surface energy of the electrolyte.

* * * * *